Figure 1:
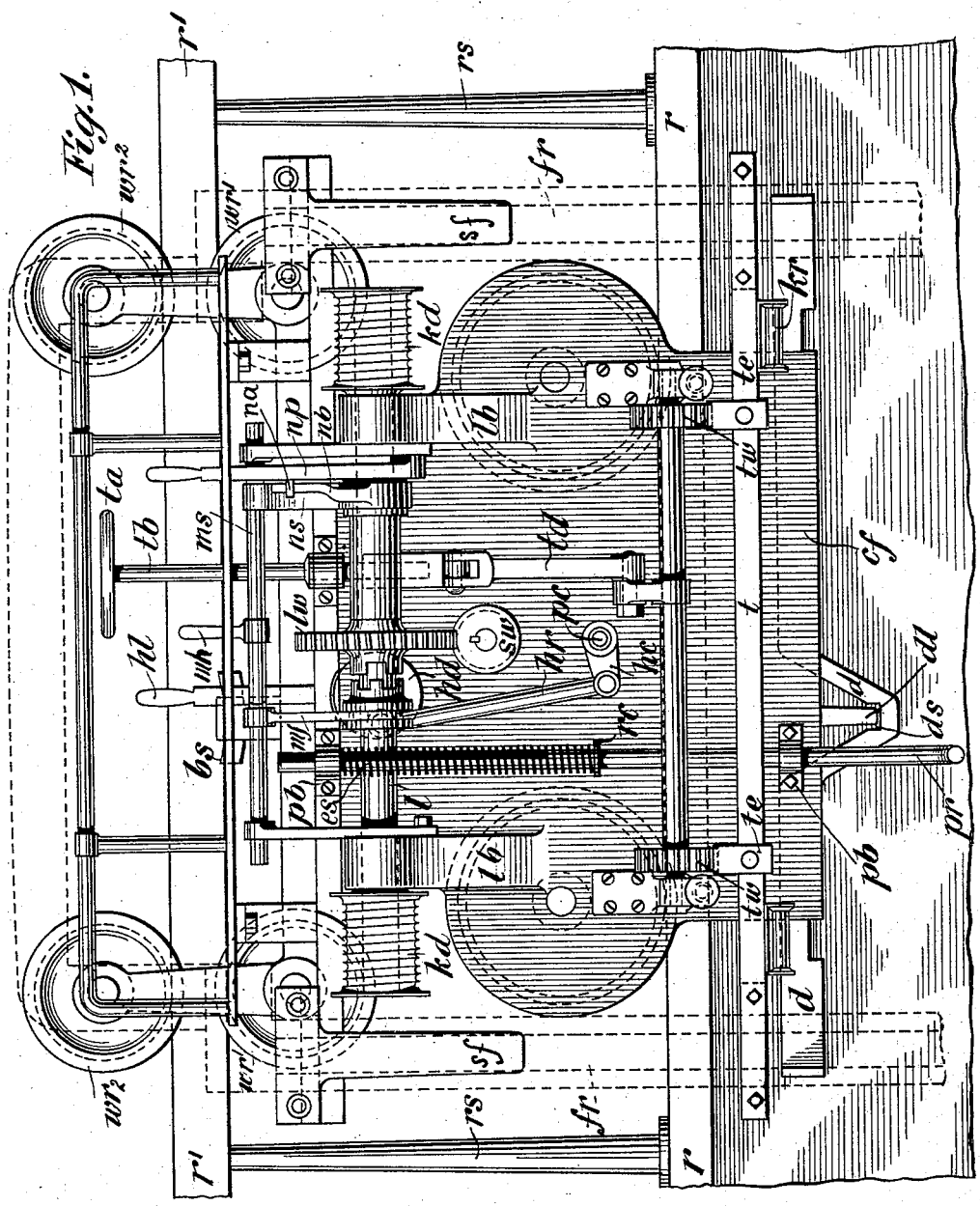

(No Model.) 7 Sheets—Sheet 1.

J. PROFT.
APPARATUS FOR CLOSING BREAKS IN HULLS OF SHIPS.

No. 577,067. Patented Feb. 16, 1897.

Witnesses
John F. Nordstrom
Richard F. Elliott

Josef Proft, Inventor
By his Attorneys
Schreiter & Van Iderstine (No Model.) 7 Sheets—Sheet 2.
J. PROFT.
APPARATUS FOR CLOSING BREAKS IN HULLS OF SHIPS.
No. 577,067. Patented Feb. 16, 1897.
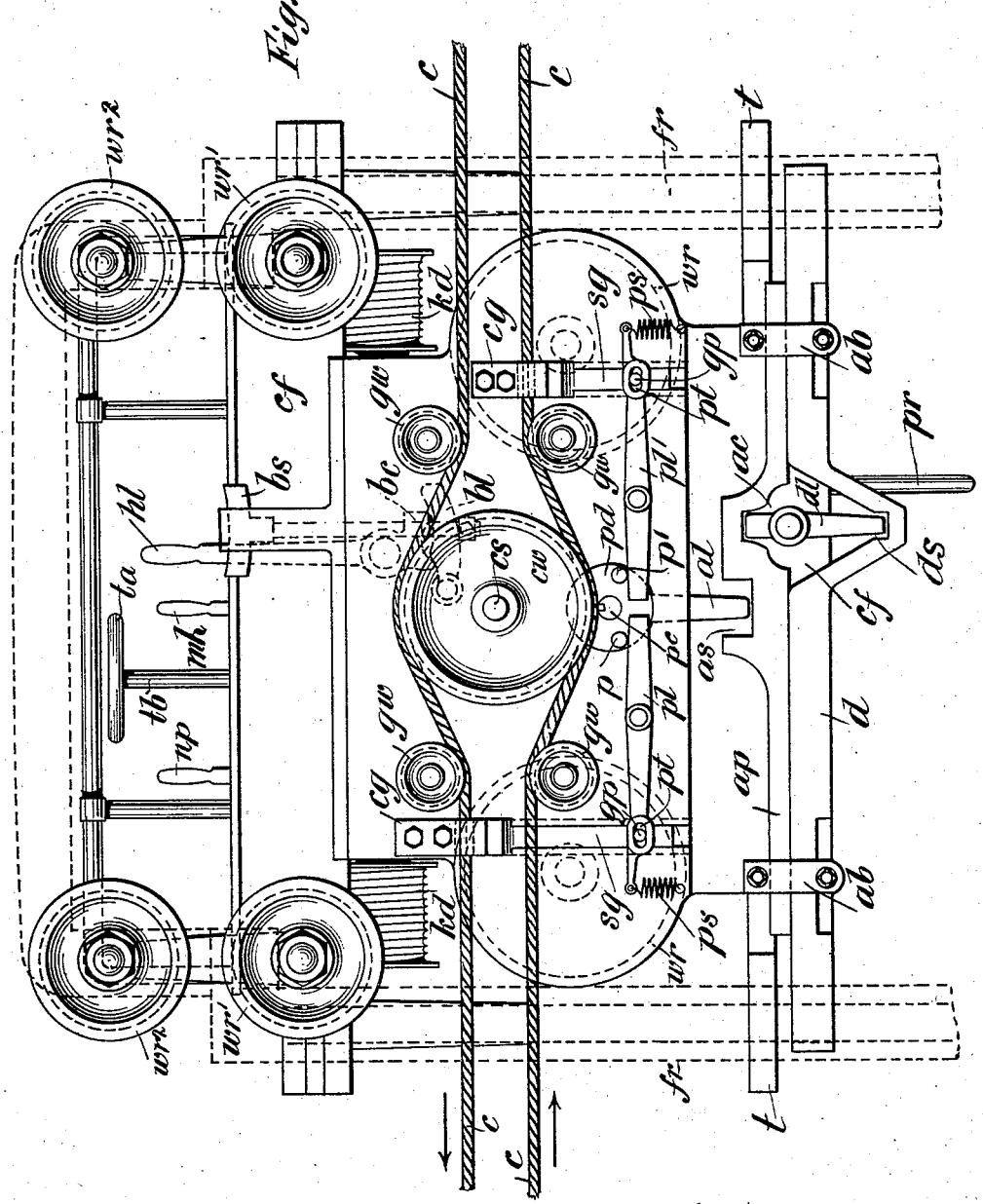

(No Model.) 7 Sheets—Sheet 3.
J. PROFT.
APPARATUS FOR CLOSING BREAKS IN HULLS OF SHIPS.
No. 577,067. Patented Feb. 16, 1897.
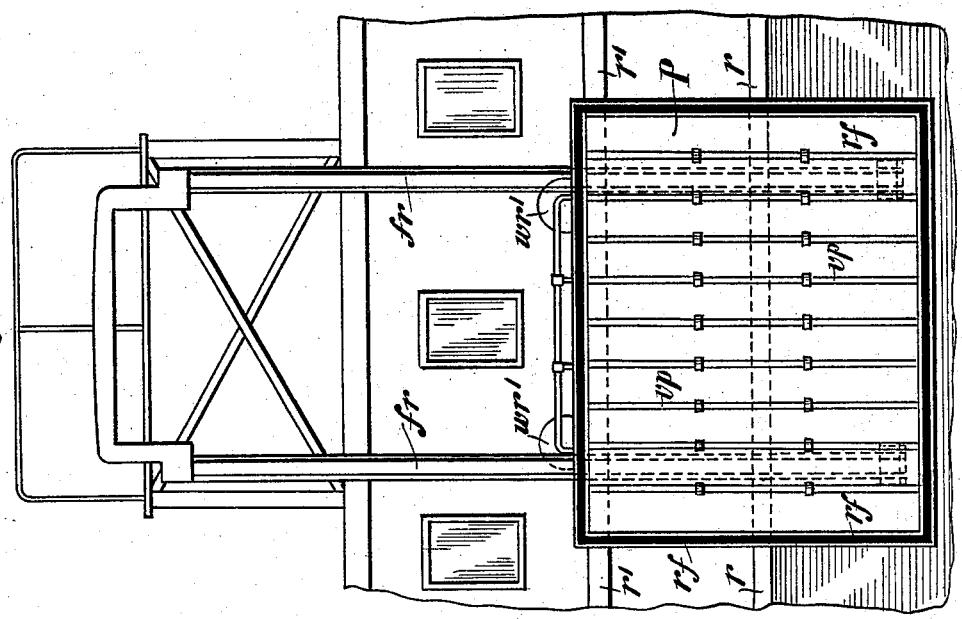
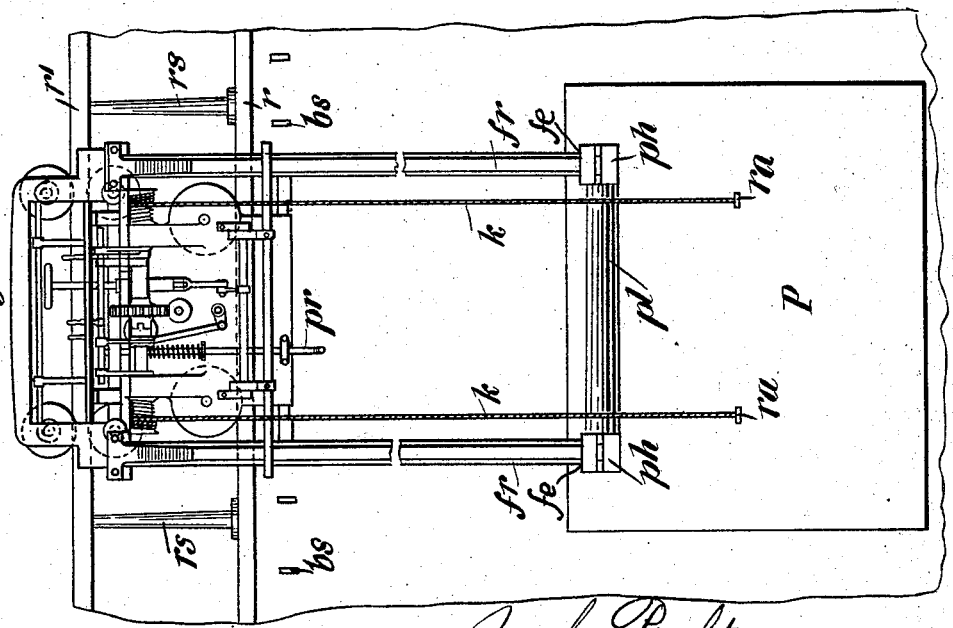
Witnesses
John P. Nordstrom
Richard J. Elliott
Josef Proft Inventor
By his Attorneys
Schreiter & Van Iderstine

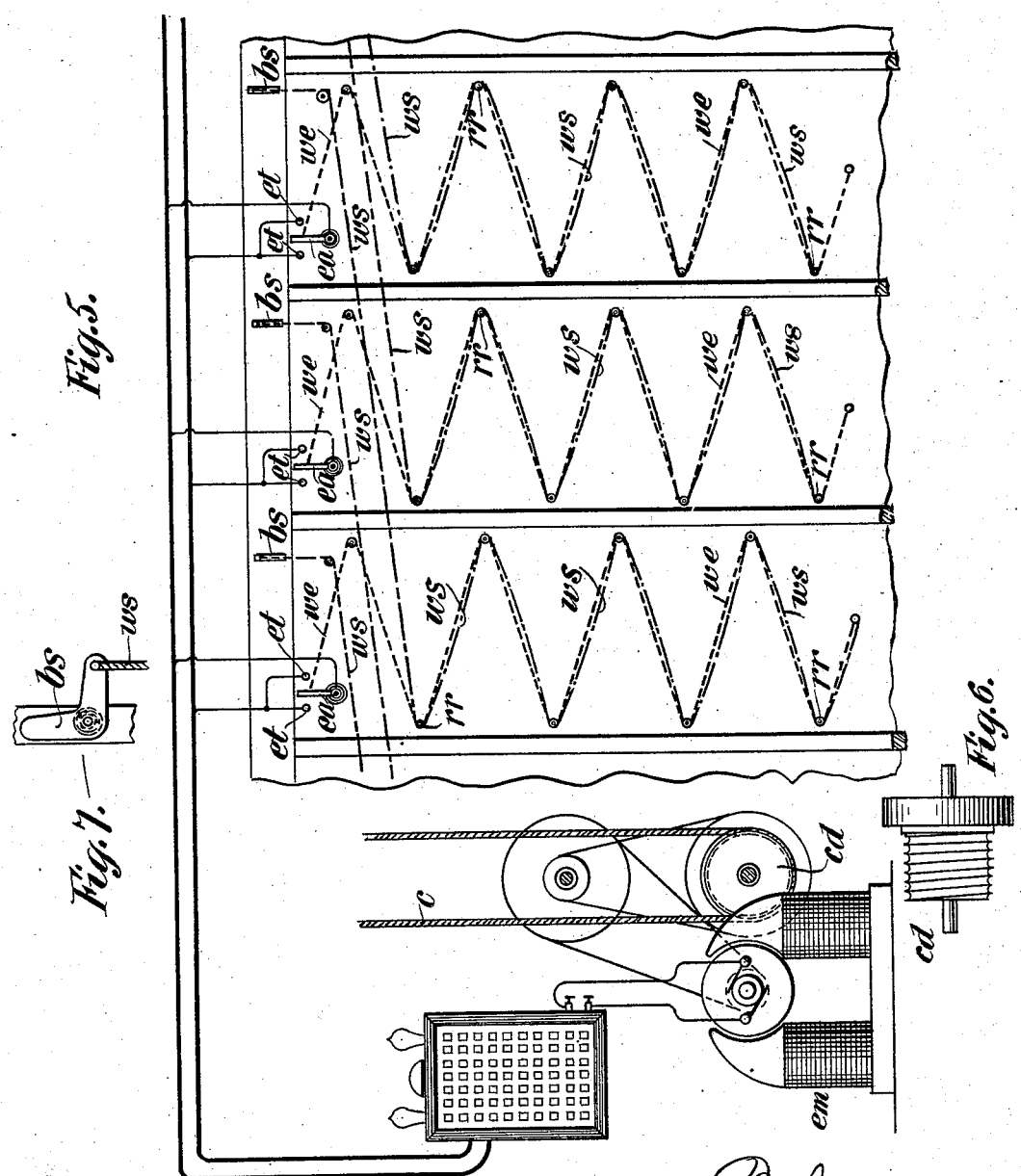

(No Model.) 7 Sheets—Sheet 5.
J. PROFT.
APPARATUS FOR CLOSING BREAKS IN HULLS OF SHIPS.
No. 577,067. Patented Feb. 16, 1897.
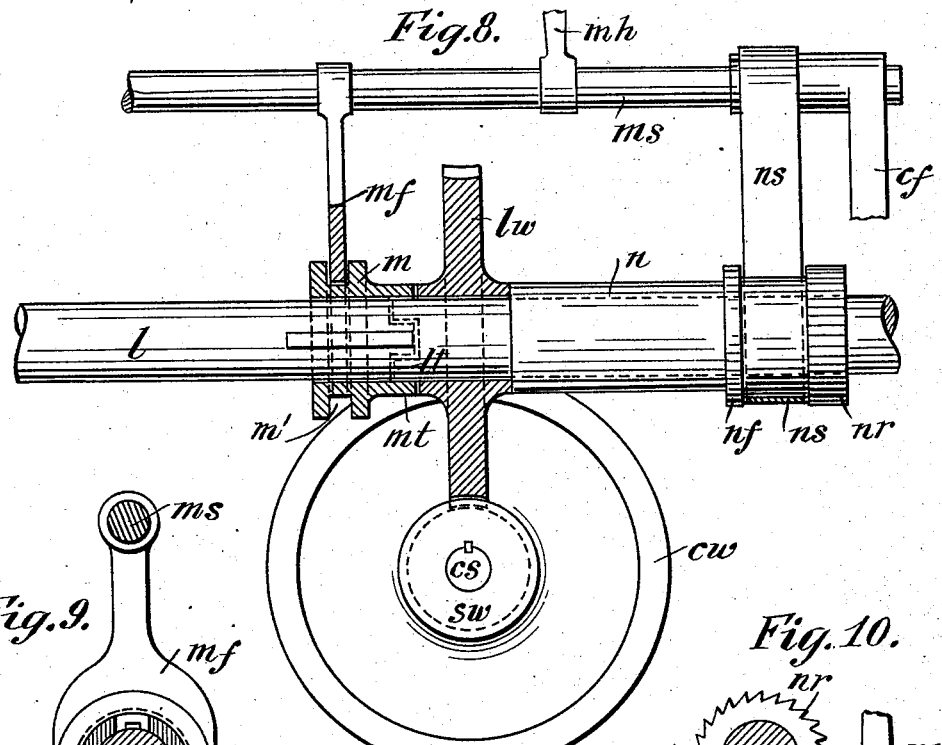
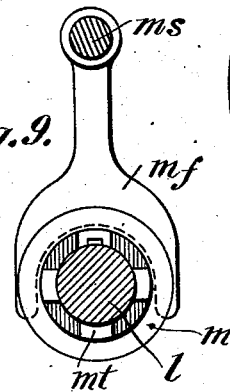
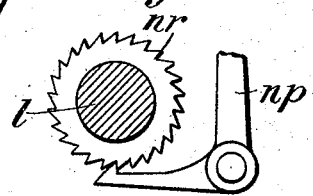
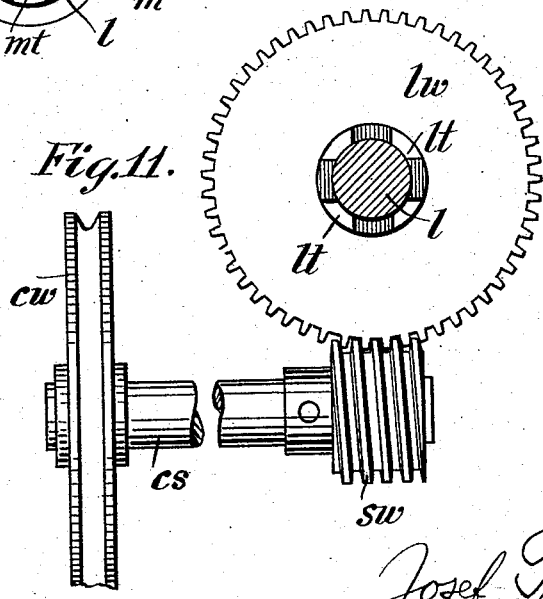
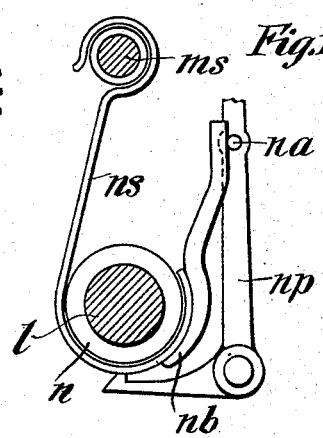

(No Model.) 7 Sheets—Sheet 6.
J. PROFT.
APPARATUS FOR CLOSING BREAKS IN HULLS OF SHIPS.
No. 577,067. Patented Feb. 16, 1897.
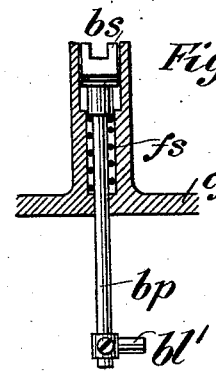
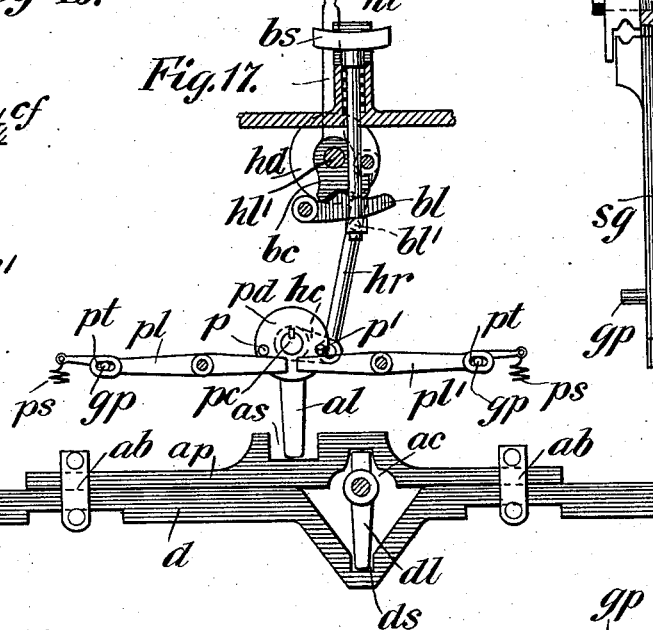
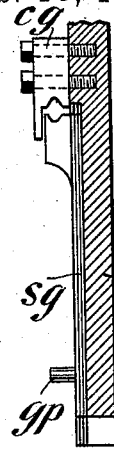
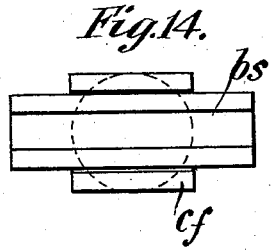
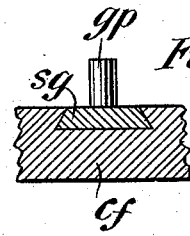
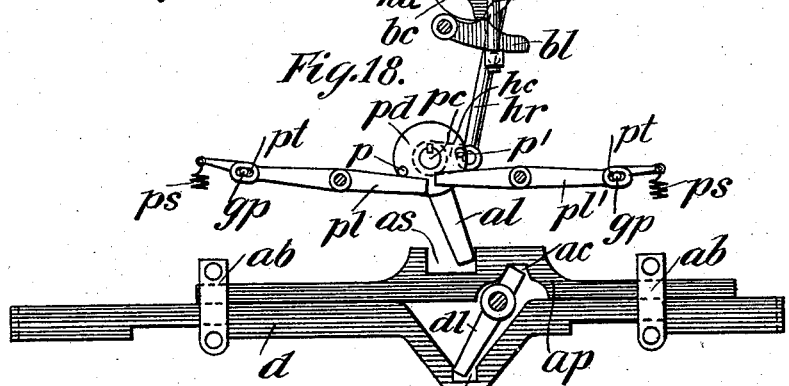
Witnesses
John P. Nordstrom
Richard J. Elliott
Josef Proft Inventor
By his Attorneys
Schreiter & Van Iderstine
THE NORRIS PETERS CO., PHOTO-LITHO., WASHINGTON, D. C.

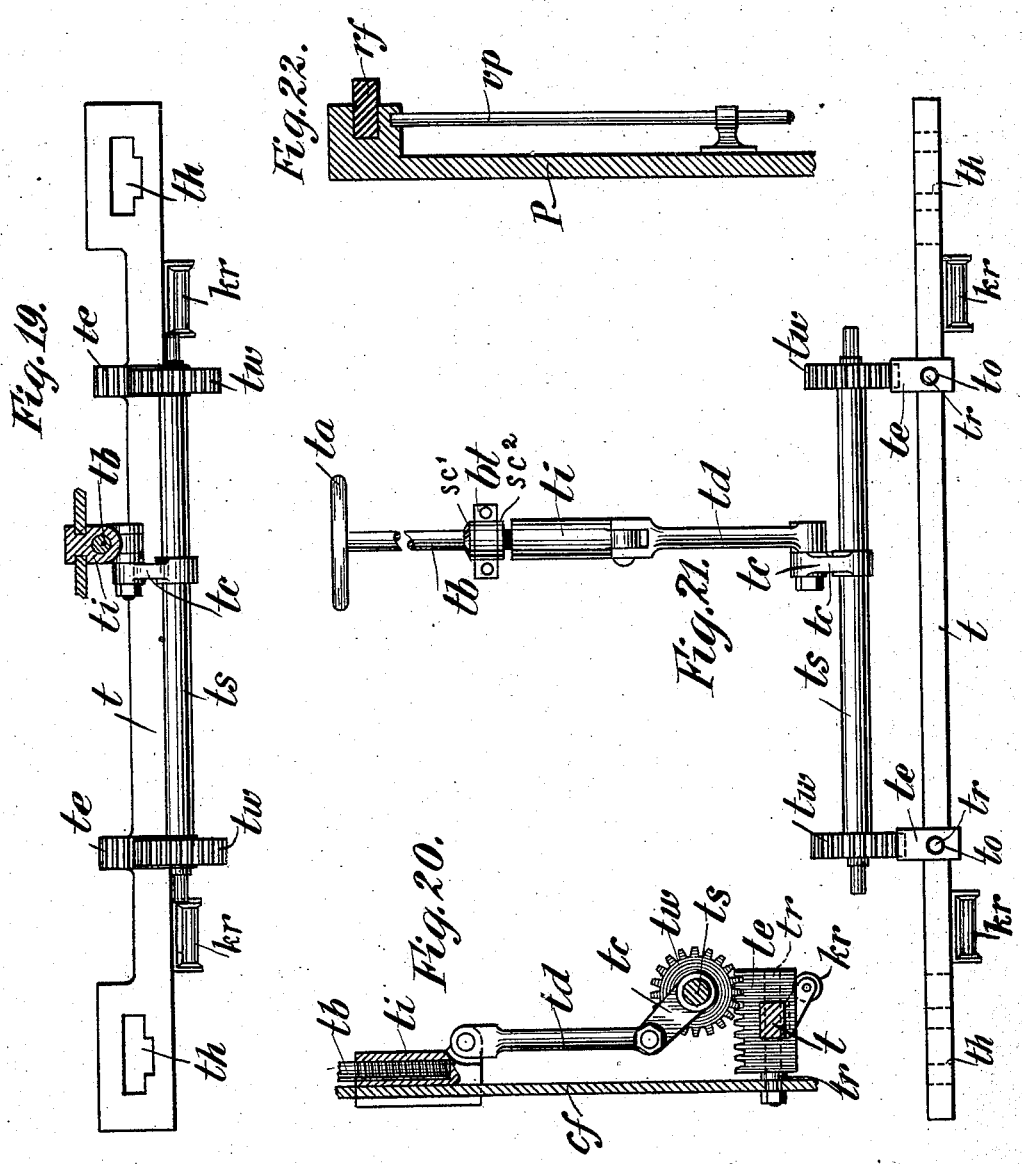

UNITED STATES PATENT OFFICE.

JOSEF PROFT, OF NEW YORK, N. Y.

APPARATUS FOR CLOSING BREAKS IN HULLS OF SHIPS.

SPECIFICATION forming part of Letters Patent No. 577,067, dated February 16, 1897.

Application filed April 20, 1896. Serial No. 588,359. (No model.)

*To all whom it may concern:*

Be it known that I, JOSEF PROFT, a citizen of the United States, residing in New York, county and State of New York, have invented certain new and useful Improvements in Apparatus for Closing Breaks in the Hulls of Ships, and the following is a specification of the apparatus and also of the manner in which it is used.

My invention relates to safety devices for sea-going vessels; and it consists of an apparatus for rapidly stopping a break in the hull of a ship and of automatic signaling devices for indicating the location of the break.

My invention is illustrated in the accompanying drawings, wherein—

Figure 1 is a front elevation of the hoisting and conveying carriage used in my apparatus. Fig. 2 is a similar view from the other side. Fig. 3 is an elevation of a part of a ship's side, showing the covering-plate lowered in position to cover a break in the hull. Fig. 4 is also an elevation of a portion of a ship's side, showing the apparatus and covering-plate in ready position when not used. Fig. 5 is a diagram of the sectional wiring in the side of the ship and its connections to the several apparatuses. Fig. 6 is an elevation of the drum driving the cable. Fig. 7 is a side view of one of the stops provided in the side of the ship. Fig. 8 is an enlarged detail of the clutching mechanism. Fig. 9 is a transverse section thereof. Fig. 10 is an enlarged detail showing ratchet-wheel and pawl set on main driving-shaft. Fig. 11 is a detail view showing worm-gear driving the main shaft. Fig. 12 shows a section of the main shaft-brake. Fig. 13 is a vertical section of the track-brake. Fig. 14 is an enlarged top view thereof. Fig. 15 is a side view of the cable-gripping jaws. Fig. 16 is a section thereof. Fig. 17 is an elevation of the mechanism for operating the cable-gripping jaws, the track-brake, and the automatic releasing mechanism, showing it in its normal or resting position. Fig. 18 is a similar view showing the position of the parts of the mechanism in action. Fig. 19 is an elevation of the brace and mechanism for drawing the plate toward the ship. Fig. 20 is a vertical section, and Fig. 21 is a front elevation thereof. Fig. 22 is a section of a portion of the plate, showing the elastic flange thereon.

Similar letters of reference indicate corresponding parts in all the views.

The history of navigation proves convincingly that in spite of all protective appliances collisions between sea-going vessels occur only too often, and that in most cases such collisions result in sinking of the rammed vessel. The protection sought to be attained by dividing the vessel into water-tight compartments depends on perfect working of the contrivances for instantaneous closing of communications between the different compartments, and experience has shown this protection to be in most cases illusory.

Having studied the horrid disasters resulting from collision of seafaring vessels, I have reached the conclusion that the only reliable protection against sinking of a vessel whose hull is broken in a collision or by a similar accident is a contrivance for a rapid and effective covering of the break from the outside of the ship's hull, and with this end in view I have invented the hereinafter-described apparatus and the devices supplementary thereto.

My invention comprises contrivances for signaling the location of the break in a ship's hull and an apparatus for rapidly conveying a suitably-shaped covering-plate to the place and for setting and securing it there in position.

The covering-plate P is large enough to cover three sections of a ship and curved correspondingly with the shape of the hull. The plate is light, to a certain extent flexible, and reinforced on its inner side by bars *vp*. Around its inner edge is provided a rubber flange *rf*, serving as packing between the plate and the ship's hull. The covering-plate is attached to the folding frame *fr*, made of T-iron and gliding in bearings provided on the hoisting and conveying apparatus or carriage, and is suspended on ropes *k*, passing over rollers *kr* and wound on drums *kd*.

In Fig. 4 the apparatus is shown in ready or normal position, the plate P being then folded up, resting against the railing of the carriage-platform and secured thereto. In Fig. 3 the plate P is shown lowered down and covering a break in the ship's hull.

The ends of the frame *fr* are flattened and slide in transversal slots provided in hinges *ph*. The lower flaps of the hinges are connected by ridge *pl* and screwed to plate P. The upper flaps are not fastened to the plate P and turn on their pivots. The slots pass correspondingly through both flaps of the hinges *ph*, and the flattened ends *fe* of the frame *fr* slide through them. When these ends are passed through both flaps of the hinges, the connection between the plate and the frame will be rigid, the upper flaps of the hinges being then prevented from turning. When, however, the ends of the frame are withdrawn from the lower flaps of the hinges, the plate P may be turned on the hinges against the frame, as shown in Fig. 4 of the drawings. To prevent the ends *fe* of the frame *fr* from slipping out of the upper flaps of the hinges *ph*, suitable set-screws are sunk in these ends and corresponding slots provided in the flaps on the side turned toward the plate.

In turning the plate P from its ready position the forward bent lower end of the spring-actuated rod *pr* operates against this ridge *pl*, whereby the turning of the plate on the hinges is assisted. The upper portion of rod *pr* is squared to prevent its turning, and the rod slides in its bearings *pb*, being pressed downward by spring *es*, set between collar *rc* and upper bearing *pb* and receding upward when the plate P is hoisted upward.

Below ridge *pl* and equidistantly from the center of the plate P are set rings *ra*, and ropes *k*, suspending the plate from the hoisting-drums *kd*, are secured thereto.

The frame *fr* guides plate P when the same is raised and lowered. The hoisting mechanism shown in detail in Figs. 1, 8, 9, 10, 11, and 12 comprises the horizontal shaft *l*, rotating in bearings in the brackets *lb*, cast in one piece with the frame of the carriage and carrying grooved drums *kd*, one on each end. Worm-wheel *lw*, set loosely on this shaft and driven by the worm *sw*, keyed to shaft *cs*, drives the hoisting-drums, as will be described. The boss of the worm-wheel *lw* is provided with clutch-teeth *lt*, fitting into teeth *ml* of clutch *m*, sliding on shaft *l* and provided with groove *m'*, wherein the tines of the fork *mf* engage. Fork *mf* is secured to the horizontal shaft *ms*, pillowed above the shaft *l* in the frames of the carriage. Handle *mh*, secured to it, projects upward through a slot in the platform, and by it shaft *ms* is moved longitudinally, thus closing and opening clutch *m* with worm-wheel *lw*, and shaft *l*, with drums *kd*, is then set in motion. The hoisting apparatus may be driven in either direction by reversing the motion of the cable. On the other side of the loose worm-wheel *lw* and secured to shaft *l* is placed sleeve *n*, having a ratchet-flange *nr* on its farther end, the teeth thereof being set against by pawl *np*, as shown in Figs. 1, 10, and 12. One arm of pawl *np* is extended through a slot in the platform of the carriage, and its other arm is shaped to securely engage with the teeth of the ratchet *nr*. The part of the sleeve *n* next adjoining ratchet *nr* and bounded by flange *nf* is smoothly finished and of slightly-larger diameter than the rest of the sleeve. To this part is applied friction-brake composed of spring *ns*, secured on one end to an extension of bearing *ms* and on the other end to the brake-arm *nb*, extending upward and pressing against pin *na*, set in the handle of pawl *np*. Thus when the handle of the pawl *np* is pulled to release ratchet *nr* the brake is at the same time applied against the sleeve *n* and thereby the speed of shaft *l* controlled when for the purpose of lowering plate P in position the ratchet *nr* is released and the clutch-wheel *lw* disengaged.

The hoisting apparatus is mounted on wheels and is propelled along the ship's sides by cable on rails *r*, on which the main weight of the apparatus is supported. Above this main rail is mounted on standards *rs* a supplementary top rail *r'*, on which doubly-flanged wheels *wr'* and *wr²* travel. These wheels move, respectively, on the upper and lower ridge of the rail *r'* and are provided for guiding the carriage when in motion. These wheels *wr'* and rail *r'* may, however, serve also for conveying the carriage to the place of the break when the lower rail *r* should be damaged by collision. Wheels *wr*, *wr'*, and *wr²* are pillowed in suitable bearings provided in the frame of the carriage. On top of the carriage is provided a platform with a suitable railing, on which the engineer or officer controlling the machine stands, and all levers, &c., which control the machine project through this platform.

The endless cable *c*, propelling the carriage along the rails, is driven from drum *cd* by the motor *em*. The endless cable runs through the carriage back and forward on suitably-constructed sheaves set parallel to rails *r*, and passes in the directions indicated by the arrows in Fig. 2, between the upper and lower guide-wheels *gw*, journaled on the inner side of the carriage. The cable passes also, one part above and the other part below, over the grooved wheel *cw*, rigidly secured to shaft *cs*, journaled in and running through the frame *cf*, thus driving worm *sw*, set on the other end of the shaft.

Opposite the upper forward and the lower rear guide-wheel *gw* are placed cable-grips consisting of a fixed jaw *cg*, with an angular groove in its lower end for the cable, and a sliding jaw *sg*, also provided with an angular groove on its upper end. Between these two jaws the cable is tightly gripped when the sliding jaw is pushed upward. The levers operating the grips and the mechanism connected therewith are arranged with the view to avoid any possible confusion in the handling and directing of the apparatus. The main lever *hl*, when moved in the direction in which the carriage is to travel, will at the same time grip the cable, release the brake holding the carriage to the rail, and set the stopping mechanism ready for action, and the carriage will be automatically stopped upon arriving on the point needed.

The cable-gripping mechanism is illustrated in Figs. 1, 2, 13, 14, 15, 16, 17, and 18 and described as follows: To the lower end of the hand-lever $hl$, pivoted to frame $cf$ and projecting up through a slot in the floor of the platform, is secured disk $hd$, to which is pivoted the rod $hr$, connecting it to crank-lever $hc$, pivoted to the frame $cf$ underneath. Pivot $pc$ is secured to crank-lever $hc$ and passes through the bearings in the frame. To its other end is secured the disk $pd$, in which are set the two pins $p$ and $p'$, bearing on the ends of levers $pl$ and $pl'$, also pivoted to the frame $cf$ and held in contact with pins $p$ and $p'$ by springs $ps$. The other ends of these levers $pl$ and $pl'$ are slotted, and in these slots $pt$ engage the pins $gp$, secured to the sliding jaws $sg$ of the cable-grips. When lever $hl$ is in its central (normal) position, these pins $p$ and $p'$ are in a horizontal line. When, however, the lever $hl$ is moved in one direction, the disk $pd$ is turned, the pin $p$ set on that side is forced down, and the corresponding lever $pl$ raises the sliding jaw, gripping thereby the cable, running in the same direction as the hand-lever $hl$ was moved. The other turn of the cable, running in the opposite direction, is not gripped. At the same time, while gripping the cable, the lever $hl$ sets the mechanism for automatically stopping the carriage on the point where the covering-plate is required. This mechanism is arranged as follows:

To pivot $pc$, on which is secured the above-described disk $pd$, is secured lever $al$, extending downward and engaging in slot $as$ of plate $ap$, sliding in bearings $ab$, secured to the frame. In another slot $ac$ on the lower rim of the plate $ap$ is engaged the shorter arm of lever $dl$. Its longer arm engages in slot $ds$ of the sliding bar $d$, journaled in the same bearings $ab$. The ends of this bar $d$ are bent into heads and abut against stopping-blocks $zs$, projected automatically from the side of the ship when a break in the hull occurs, as will be described. When the hand-lever $hl$ is moved to grip the cable, lever $al$, actuated thereby, pushes the sliding plate $ap$ correspondingly, and lever $dl$ pushes in turn the sliding bar $d$ forward in the same direction as lever $hl$ is moved and in the same direction the carriage then travels. When the head of bar $d$ abuts against the stop $zs$, its progress is arrested, and as the carriage is moved on by the cable bar $d$ is pushed back, and lever $dl$ pushes the plate $ap$ in the opposite direction. Lever $al$ then turns disk $pd$, disengaging the grip of the cable and returning the hand-lever $hl$ to its normal position. With the same movement the brake $bs$ is released. The spring $fs$ recoils, pressing it onto the track, thereby stopping the carriage in the position centrally over the break in the hull.

The mechanism operating the brake is constructed as follows: Cam $bc$, set on pivot $hl'$ and moved by lever $hl$, is provided with suitably-shaped extensions operating on lever $bl$, and when lever $hl$ is pushed to either side from its normal position lever $bl$, pivoted to the frame just below cam $bc$, is pressed downward. Lever $bl$ rests against pin $bl'$, set in rod $bp$, carrying on its upper end the brake-shoe $bs$. Spring $fs$, slid on rod $bp$ below the brake-shoe and resting against the bearing in the frame, presses the brake upward against rail $r'$. When lever $hl$ is moved to grip the cable in either direction, cam $bc$ forces the brake-shoe $bs$ down against the action of the spring $fs$, and, again, when lever $hl$ is returned to its normal position by the action of bar $d$, abutting against a projecting stopper, the brake is released, as described above.

The covering-plate P, when adjusted in position to cover the leak, is pressed against the hull of the ship by mechanism operated from the platform of the carriage. For this purpose the arms of guiding-frame $fr$ pass through apertures $th$ in the strong cross-tie $t$. Through borings $to$ in blocks $te$ pass the two rods $tr$, set in the frame $cf$, and the cross-tie $t$ may be moved horizontally thereon. The top sides of blocks $te$ are geared with wheels $tw$, set on the ends of shaft $ts$, journaled in brackets cast on the frame. Shaft $ts$ is turned by the crank $tc$, pivoted to the connecting-rod $td$, joining it to block $ti$, sliding vertically in a slot of the carriage-frame and provided with screw-thread and adapted to be drawn upward by the screw $tb$, pillowed in bracket $bt$, secured to the casting. Stop-collars $sc'$ and $sc^2$, set on the screw $tb$ on each side of this bracket, prevent any vertical motion thereof. Screw $tb$ is extended upward through the platform and is turned by hand-wheel $ta$, set on its upper end. When the plate is to be pressed against the ship's hull, hand-wheel $ta$ is turned to raise the sliding block $ti$, and thus crank $tc$ and shaft $ts$ and also wheels $tw$ are turned, and the arms of the guiding-frame $fr$, moved forcibly by the cross-tie $t$, press the plate P against the hull. This mechanism is also used to fasten plate P on the carriage when in position of rest.

For signaling a break and for indicating its location the hull of the ship is divided into vertical sections extending from the deck to the keel and separately numbered on each side of the ship. In each of these sections are strung, between the outer skin of the ship and the inner lining, thin wires $we$ and $ws$, passing around rollers $rr$ in zigzag lines across the section from bottom to top. One of these wires is tied to anchor $ea$, pressed toward one of the forked poles $et$ by a spiral spring wound around its pivot. An electric wire is connected to anchor $ea$, and the other wire of the same electric circuit is connected to the two termini $et$. When the hull is broken by an accident in one or more sections, wires $we$ are stretched or broken. The anchor then connects with one of the termini $et$, closing the electric circuit, and a set of bells, one located on the bridge of the ship, another at the captain's cabin, still another at the steering-house, and more in such other places as may be desired, are started ringing. To the same electric circuit is connected an indicator or annunciator (or set of annunciators located in these or other places) indicating, by displaying a corresponding number or a letter, in what section of the ship the break occurred, and the current also throws a switch closing another circuit, lighting signal-lights at given points to visibly indicate where the break has occurred. The contact may be also used to throw switches starting electric motors located, preferably, in the steering-house and in the hold of the ship, the former, $em$, driving cable $c$, operating the apparatus for lowering the plate to cover the hole in the ship and the other working the pumps of the ship. The other wires $ws$ pass from the uppermost roller $rr$ in the section to one arm of a spring-actuated stop located three sections farther from the center of the ship. This stop consists of a bell-crank lever $zs$, pivoted in the side of the ship, with a spring wound on its pivot pressing it outward from the hull, and when the wire $ws$, holding it back, is broken the stop is thrown outward.

The operation of stopping a break in the hull of a ship with my improved apparatus is as follows: When a break is signaled in the manner as described above and the motors started, an officer or engineer designated for the duty steps on the platform of the carriage and first releases plate P by turning hand-wheel $ta$ and then pulling the handle of the pawl $np$, thereby releasing shaft $l$, (clutch $m$ being at this time disengaged from worm-wheel $lw$.) The plate P is then allowed to turn on hinges $pl$ until it hangs freely suspended on the ropes. By the same operation of releasing the plate also the frame $fr$ is released from its fastenings on the bridge and moved clear of all rigging of the ship. The flattened ends $fe$ of the frame $fr$ slip thereby into the lower rigid parts of hinges $ph$, thus making rigid the connection between the plate P and the frame $fr$. The man in charge of the apparatus next throws lever $hl$ in the direction where the brake is signaled. By this motion the cable is gripped, the rail-brake withdrawn, and the stopping apparatus is set. The carriage is then rapidly conveyed by the cable to that part of the ship where the break occurred. When the carriage reaches the section where the hull was broken, bar $d$ abuts against stop $zs$, and the motion of the car is automatically stopped in the manner as described above. Then the man in charge again takes hold of the handle of pawl $np$ and moves it to release shaft $l$, at the same time applying the brake to it. By this action plate P is lowered, guided by frame $fr$, until it reaches the location of the break. The adjusting of the plate in exact position is effected by lifting and lowering it by means of the handle $np$, operating the pawl and the brake, and of handle $mh$, operating clutch $m$. The suction of the water passing through the break into the hold of the ship will draw the plate toward the hull. When the same reaches opposite the break and as soon as adjusted in position, the plate P is pressed against the hull by turning the hand-wheel $ta$. The rubber flange surrounding the outer edge of the plate will close any leaks between the hull of the ship and the plate and the flow of the water into the ship will be stopped. When the pumps have removed the water from the hold of the ship, plate P is secured permanently to the ship's hull from the inside of the ship by cross-bars or by hooked bolts attached to rods $vp$, bracing plate P, and by bolting these cross-bars or bolt to the framework of the ship.

I claim as my invention and desire to secure by Letters Patent—

1. In an apparatus for stopping a break in the hull of a ship, the combination with a flexible plate adapted to cover the break in the hull of the ship and to be secured thereto, of a combined hoisting and conveying carriage, comprising a main shaft mounted in bearings on a movable frame, hoisting-drums rigidly secured, one on each end of the shaft, a sleeve keyed to the main shaft, a worm-wheel rotating thereon, a driving-shaft pillowed in the frame of the carriage, underneath the main shaft, a grooved pulley rigidly keyed to the driving-shaft and adapted to be driven by a cable, a worm rigidly connected to the driving-shaft, and gearing with the worm-wheel, a sliding clutch keyed to the main shaft, and adapted to clutch with the worm-wheel, a sliding shaft pillowed in brackets above the main shaft, a forked shifter secured to the sliding shaft and engaging in the groove of the clutch, a handle projecting through the platform of the carriage and secured to the sliding shaft, a ratchet-wheel and a brake-collar joined with the sleeve, a pawl pivoted in the bracket, supporting the bearing of the main shaft, a handle secured to the pawl and projecting upward through the platform of the carriage, a pin set in the handle, a brake comprising a spring inclosing the brake-collar and a rigid lever secured thereto and resting against the pin set in the handle, the spring pressing also the pawl against the ratchet-wheel.

2. In an apparatus for stopping a break in the hull of a ship, comprising a flexible plate, adapted to cover the break in the hull of the ship and to be secured thereto, and an ambulant hoisting-machine adapted to be driven by an endless cable, passing in opposite directions over a grooved driving-wheel rigidly connected to the driving-shaft, the combination with the grooved driving-wheel of grooved guide-wheels, set in pairs on both sides of the driving-wheel and forcing the cable to pass partly around the driving-wheel, thereby increasing the length of contact between the cable and the driving-wheel and also the friction.

3. In an apparatus for stopping a break in the hull of a ship, comprising a flexible plate adapted to cover the break in the hull of the ship and to be secured thereto, and a movable hoisting-machine, adapted to be driven by an endless cable passing in opposite directions over a grooved driving-wheel rigidly connected to the driving-shaft, the combination with the hoisting apparatus and with the truck-wheels, set in the frame and adapted to convey the hoisting-machine on rails provided around the ship's deck, of an apparatus for gripping the cable, comprising two fixed jaws secured to the frame of the carriage, one on each side of the driving-wheel, movable jaws secured to tails, sliding in dovetailed grooves provided in the frame of the carriage, pins set in the tails of the movable jaws, levers fulcrumed in the carriage-frame engaging the pins, springs connected to the ends of the levers and drawing the jaws apart, an oscillating disk keyed to a pivot turning in bearings in the frame of the carriage, pins operating the levers set in the oscillating disk, a crank rigidly keyed to the pivot of the oscillating disk, a hand-lever pivoted to the carriage-frame, a rod connecting the crank keyed on the pivot of the oscillating disk, a disk set on the pivot of this lever, the hand-lever projecting through the platform of the carriage and turning the oscillating disk when moved from its normal position, thereby closing the jaws and gripping the cable, and starting the carriage in the same direction as the hand-lever is moved.

4. In an apparatus for stopping a break in the hull of a ship, comprising a flexible plate adapted to cover the break in the hull of the ship and to be secured thereto, and a movable hoisting-machine adapted to be driven by an endless cable passing in opposite directions over a grooved driving-wheel rigidly connected to the driving-shaft, the combination with the apparatus for gripping the cable, and with the apparatus for automatically releasing the grip of the cable, of a rail-brake comprising a brake-shoe adapted to be pressed against the rail, a stem secured in the brake-shoe, a spiral spring set on the stem of the brake and pressing the shoe against the rail, a pin secured adjustably to the stem of the brake, a cam-lever oscillating on a pivot, set in the frame of the carriage, a cam with two projections rigidly secured to the pivot of the hand-lever operating the cable-gripping apparatus, and pressing against the oscillating lever, forcing it downward, and thereby withdrawing the brake from the rail, when the lever is moved from its normal position to grip the cable.

5. In an apparatus for stopping a break in the hull of a ship, comprising a flexible plate adapted to cover the break in the hull of the ship and to be secured thereto, and a movable hoisting-machine adapted to be driven by an endless cable passing in opposite directions over a grooved driving-wheel, rigidly connected to the driving-shaft, the combination with the apparatus for gripping the cable, of a contrivance for automatically releasing the grip of the cable and for stopping the carriage in the place, where the break occurred, the contrivance comprising a spring-actuated stopper pivoted in the hull of the ship, a wire strung in zigzag lines across the section of the ship, and holding the stopper within the hull, the stopper being projected from the hull of the ship when the wire is broken by a collision, a slotted plate sliding in bearings provided in the frame of the carriage, a slotted stop-bar sliding in the same bearing, a doubly-armed lever pivoted to the frame of the carriage and engaged with its shorter arm in the slot of the sliding plate, and with its longer arm in the slot of the stopping-bar, a lever secured to the pivot of the oscillating disk, operating the cable-gripping mechanism and engaging in a slot of the sliding plate, the lever moving the sliding plate when the oscillating disk is turned, setting thereby the stopping-bar accordingly in the directions in which the carriage moves, and turning again the oscillating disk, disengaging thereby the cable-gripping mechanism and also the rail-brake, when the stop-bar strikes against the stop projecting from the hull of the ship and by which its forward motion is arrested.

6. In an apparatus for stopping leaks in hulls of ships, comprising a flexible plate adapted to cover a break in the hull of the ship and to be secured thereto, and a movable hoisting-machine adapted to convey the plate to the place of the break and to lower the same in the required position, the combination with the conveying and hoisting apparatus and with a frame guiding the plate in its descent, of a device for pressing the plate to the hull of the ship when finally adjusted in position, the device comprising a rigid cross-tie having apertures through which the guiding-frame slides vertically, studs secured in the frame of the carriage and supporting the cross-tie on the frame of the carriage, racks rigidly secured to the cross-tie, a shaft set in bearings secured to the carriage from above the cross-tie, cog-wheels gearing with the rack keyed to the shaft, a crank rigidly secured to the shaft, a screw-threaded block adapted to slide vertically in a slot, provided in the frame of a carriage, a connecting-rod connecting the crank secured to the shaft, with the sliding block, a screw-threaded shaft engaging in the screw-thread of the sliding block, set vertically in brackets above the sliding block and projecting upward through the platform of the carriage, stop-collars secured to the screw-threaded shaft on both sides of the bracket, and a hand-wheel secured to the screw-threaded shaft and adapted to turn the shaft, thereby moving the sliding block upward and turning the crank and the shaft connected thereto, the cog-wheels then forcing the cross-tie and, with it, the guiding-frame of the plate engaged in the apertures on the ends thereof, and the plate itself to the hull of the ship.

7. In an apparatus for stopping the leaks in hulls of ships, comprising a flexible plate adapted to cover a break in the hull of the ship and to be secured thereto, and a movable hoisting-machine adapted to convey the plate to the place of the break and to lower the same into required positions, the combination with electrical signaling devices and with an oscillating anchor located between two contact-pieces, a recoil-spring set on the pivot of the oscillating anchor, and pressing it against one of the contact-pieces, of wires strung in zigzag lines, separately in each section of the ship, the wire holding the anchor against the pressure of the spring between the two contact-pieces, the spring throwing it over to the contact-piece when the wires are broken, whereby the electric circuit, actuating the signaling devices and closing switches, starting the machines and other apparatus, is closed, and the break and its location in the hull are signaled on the deck of the ship and in other places as may be required.

In witness that I claim the improvements described in the foregoing specification I have signed my name in the presence of two subscribing witnesses.

JOSEF PROFT.

Witnesses:
RICHARD I. ELLIOTT,
E. C. NIELSON.